United States Patent [19]

Readey et al.

[11] 4,026,811
[45] May 31, 1977

[54] MICROWAVE DIELECTRICS

[75] Inventors: Dennis W. Readey, Framingham; Edward A. Maguire, Jr., Ashland; Albert E. Paladino, Needham, all of Mass.

[73] Assignee: Raytheon Company, Lexington, Mass.

[22] Filed: Jan. 30, 1975

[21] Appl. No.: 545,462

Related U.S. Application Data

[63] Continuation of Ser. No. 385,017, Aug. 2, 1973, abandoned, which is a continuation of Ser. No. 130,356, April 1, 1971, abandoned.

[52] U.S. Cl. .................. 252/63.2; 264/65; 264/66; 252/63.5; 423/598
[51] Int. Cl.² .................. H01B 3/00; C01G 23/00
[58] Field of Search ......... 423/598; 252/63.5, 63.2; 264/65, 66

[56] References Cited

UNITED STATES PATENTS

| 2,438,761 | 5/1948 | Martin | 423/598 X |
| 2,777,773 | 1/1957 | Callaham | 423/598 X |
| 3,456,048 | 7/1969 | Brandmayr | 252/63.5 X |
| 3,509,057 | 4/1970 | Greger | 423/598 X |
| 3,521,825 | 7/1970 | Morcom | 423/598 X |

OTHER PUBLICATIONS

Rase et al., "Journal of American Ceramic Soc.", vol. 38, 1955, pp. 102–113.
Rosenthal et al, "Ceramic Bulletin", vol. 37, 1958, pp. 370–375.

*Primary Examiner*—Herbert T. Carter
*Attorney, Agent, or Firm*—David M. Warren; Joseph D. Pannone; Milton D. Bartlett

[57] ABSTRACT

A group of dielectric compounds and mixtures of dielectric compounds with useful properties at microwave frequencies is disclosed. The dielectric materials are temperature compensated, have relatively high dielectric constants, and comprise the group of $BaTi_4O_9$, and mixtures of $Li_2TiO_3$ and $Li_4Ti_5O_{12}$, $MgTi_2O_5$ and $TiO_2$, $Zn_2TiO_4$ and $TiO_2$, and $BaTi_4O_9$ and $TiO_2$.

1 Claim, 4 Drawing Figures

MICROWAVE DIELECTRICS

CROSS REFERENCE TO RELATED APPLICATIONS

This is a continuation of application Ser. No. 385,017, filed Aug. 2, 1973, now abandoned which is a continuation of application Ser. No. 130,356 filed Apr. 1, 1971 (now abandoned).

BACKGROUND OF THE INVENTION

This invention relates to mixtures of dielectric compounds for use as microwave dielectrics at microwave frequencies such as XS and C band and having the properties of high dielectric constant, low dielectric loss at microwave frequencies and a low temperature coefficient of dielectric constant. The above dielectric materials because of their dielectric properties are highly desirable as substrates for microwave integrated circuits where dielectric constant insensitivity to temperature variations is a requirement; for dielectric filters, for example, in wave guides; for dielectric loading of ferrite phase shifters at either X, S or C band operation and as a temperature compensated dielectric in stripline applications such as stripline circulators in which a high dielectric constant at high frequency with low losses is a requirement. Additionally, such materials are useful as quarter wave plates at L band due to the reduction in size because of the high relative dielectric constant and even as a solid dielectric wave guide as a replacement for alumina which currently has wide application.

In the prior art such dielectric materials as $BaTi_4O_9$ and zinc titanate have been prepared, however, have not found use in the above-mentioned microwave applications because of difficulty encountered in fabricating the materials which results in wide variations in material dielectric properties from batch to batch of finished material.

The present invention describes a method of manufacture of the above high dielectric constant materials such that ease of fabricability coupled with highly reproducible dielectric properties is obtainable at minimal cost and with the materials exhibiting high mechanical strength and densities approaching theoretical density for the materials.

SUMMARY OF THE INVENTION

Methods of manufacturing $BaTi_4O_9$, and mixtures of $BaTi_4O_9$ and $TiO_2$, $Li_2TiO_3$ and $Li_4Ti_5O_{12}$, $MgTi_2O_5$ and $TiO_2$, and $Zn_2TiO_4$ and $TiO_2$ are disclosed in which the materials are prepared by mixing carbonates and/or oxides of the constitutents in ball mills with appropriate allowance in the formulation to take into account the addition of one of the constituents due to abrasion of the mill lining and media. The mixtures are calcined at temperatures of 800° to 1300° C for a period of up to 10 hours. Final firings are conducted at temperatures of approximately 1100° to 1450° C for up to 10 hours in oxidizing atmospheres. As an alternative, hot pressing may be employed rather than firing or both firing and hot pressing may be utilized. Dielectric materials of high relative densities with low dielectric losses and a range of dielectric constant values and temperature coefficients of the dielectric constant from positive to negative and with near perfect temperature compensation may be achieved. In particular, a novel method for the preparation of $BaTi_4O_9$ is disclosed in which any desired shape of the material may be produced such that the resultant dielectric properties are almost identically reproducible from batch to batch, with each manufactured piece of material having high mechanical strength and low temperature coefficient. Two phase systems of mixtures of dielectrics having positive and negative temperature coefficients which produce high dielectric constant compensated material are also disclosed.

DESCRIPTION OF THE PREFERRED EMBODIMENT

Figure 1:
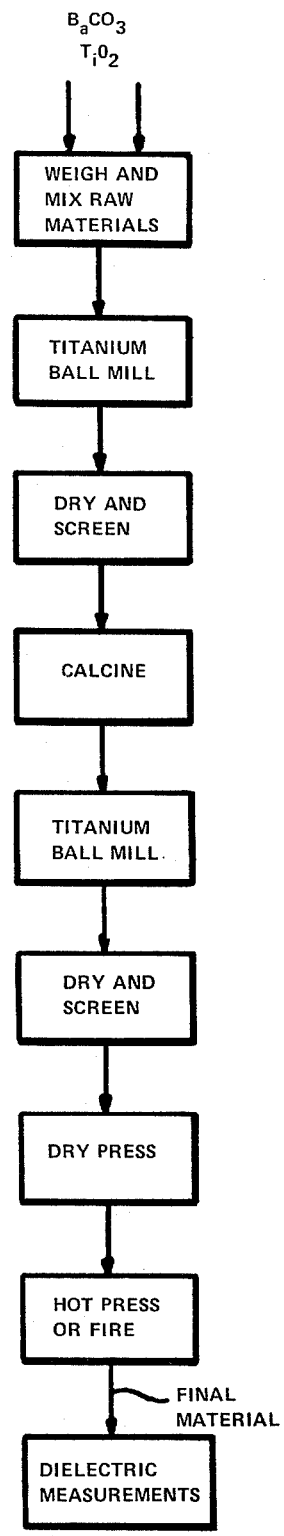
FIG. 1 is a flow diagram of the method of manufacturing $BaTi_4O_9$ from $BaCO_3$ and $TiO_2$ in accordance with the present invention.

Referring now to FIG. 1, a flow chart of the method of manufacture of $BaTi_4O_9$ in accordance with the present invention is illustrated. The batch size is of course dependent upon the amount of $BaTi_4O_9$ required; however, 250 gram and one kilogram batches have been prepared. The $BaTi_4O_9$ is prepared by mixing carbonates and/or oxides of the constitutents in ball mills with appropriate allowance in the formulation to take into account the addition of one of the constituents due to abrasion of the mill lining and media. The mixture is calcined at a temperature of 900°-1150° for a period of up to 10 hours with final firing conducted at temperatures of 1200°-1400° for up to 10 hours in oxidizing atmospheres, and the end product $BaTi_4O_9$ is of high relative density, high dielectric constant, low dielectric loss and has a temperature stable dielectric constant.

Stoichiometric quantities of $BaCO_3$ and $TiO_2$ of reagent grade available from the J. T. Baker Chemical Company are weighed and mixed in the proportion of one mole of $BaCO_3$ to four moles of $TiO_2$. Allowance must be made for pick up from the mill to bring the fully processed batch to the desired stoichiometery. The rate of pick up was, for example, typically 0.09 grams of titanium per hour of milling, thus, approximately two grams of $TiO_2$ per one hundred grams of batch material are left out at the weighing and mixing stage. The $BaCO_3$ and $TiO_2$ mixture is ball milled for 16 hours in a titanium ball mill in an inert medium of methyl alcohol, for example, at room temperature. The speed of the mill is typically 80 percent of the critical speed and the amount of methyl alcohol is typically 60 percent by volume of liquid slurry, which is between 130 to 150 percent of the weight of the mixture without alcohol. Of course other inert substances such as water may be used to form the mechanical slurry.

After ball milling, the mills are discharged into open pans and the methyl alcohol removed by drying at about 60° C. The dried materials are granulated through a 50 mesh stainless steel screen into an enamel pan and form a cake like substance. Following drying and screening the granulated mechanical mixture is calcined at approximately 1150° C with the calcine product appearing as a porous clinker or semisintered substance. Following calcining the batches of BaTi$_4$O$_9$ are again milled for 16 hours in a titanium ball mill in an inert methyl alcohol medium under conditions substantially identical to the first ball milling step after which the resulting BaTi$_4$O$_9$ is again dried and granulated to insure batch homogeneity. The BaTi$_4$O$_9$ is then dry pressed in a mold at room temperature at pressures between 1500 psi to 10,000 psi. The material is then hot pressed to insure high density and/or conventionally fired at approximately 1200° C by being brought up from room temperature at 100° C per hour. The BaTi$_4$O$_9$ is held at 1250° C for 10 hours and then furnace cooled from between 18 to 24 hours to room temperature. The firing was done in a pure oxygen atmosphere to insure that titanium does not reduce. The final material shape may be either bar like, disc like or any other same results were obtained both at C-band (5.35 gigahertz) and S-band (2.68 gigahertz). BaTi$_4$O$_9$ has an orthorhombic structure and an X-ray density of 4.54 grams per cubic centimeter. Both hot pressed and conventionally fired material as well as material from different batches when made in accordance with the before described process consistently yield material with densities in excess of 97 percent of theoretical. Dielectric constant, dielectric loss and temperature coefficient are extremely constant, reproducible and predictable from batch to batch irrespective of whether conventional firing or hot pressing is used for densification in fabrication. This consistency of properties makes BaTi$_4$O$_9$ a highly useful high dielectric constant microwave material. The following table contains dielectric properties on batches of BaTi$_4$O$_9$ made in accordance with the instant method.

| Batch No. | Sintering or Hot Pressing Conditions | | Density | | 1 MHz | | X-Band | | |
|---|---|---|---|---|---|---|---|---|---|
| | Temp (° C) | Time min | Bulk g/cc | Percent | k | tan $10^{-4}$ | k | tan $10^{-4}$ | $\tau$ ppm/° C |
| 1 | 1255 | 600 | 4.48 | 98.7 | 38.28 | 11.7 | 38.20 | 4.2 | −50 |
| 2 | 1255 | 600 | 4.47 | 98.5 | 38.29 | 15.0 | 38.18 | 4.2 | −55 |
| 3 | 1255 | 600 | 4.48 | 98.7 | 37.17 | 11.6 | 38.18 | 4.17 | −54 |
| 4 | 1255 | 600 | 4.47 | 98.5 | 38.26 | 26.5 | 38.17 | 4.17 | −55 |
| 5 | 1255 | 600 | 4.47 | 98.5 | 38.33 | 9.8 | 38.19 | 3.27 | −56 |
| 6 | 1255 | 600 | 4.48 | 98.7 | 38.29 | 9.2 | 38.26 | 4.15 | −55 |
| 7 | 1255 | 600 | 4.47 | 98.5 | 38.10 | 9.2 | 38.15 | 3.28 | −50 |
| 8 | 1255 | 600 | 4.48 | 98.7 | 38.49 | 10.4 | 38.28 | 4.60 | −50 |
| 9 | 1265 | 600 | 4.43 | 97.6 | 38.00 | 37.8 | 37.83 | 4.9 | −54 |
| 10 | 1265 | 600 | 4.45 | 97.9 | 38.03 | 26.9 | 37.90 | 3.2 | −49 | desired shape, such as cylindrical.

Prior to compacting, some of the powder from each batch may be placed in zirconia crucibles and heated several hours at 800° C in an oxidizing atmosphere to convert to oxides any metallic titanium picked up during the second milling. Compacts of 0.625 inch diameter were formed in a steel die at 8500 psi for hot pressed material with each compact being placed in a stabilized zirconia die measuring 0.75 inch diameter by 2 inches high. The compact was surrounded by stabilized zirconia such to eliminate sticking to the die walls or plunger faces, and the assembled die was placed in a resistance heated furnace with a pressure of 5700 psi applied to the plungers.

Figure 2:
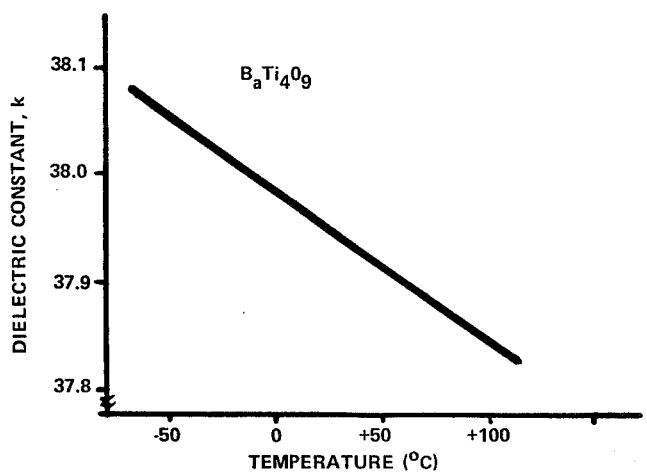
FIG. 2 is a graph of the dielectric constant plotted against temperature variation for $BaTi_4O_9$.

Referring now to FIG. 2, a plot of the dielectric constant variation with temperature for BaTi$_4$O$_9$ produced by the process described with respect to FIG. 1 is illustrated. The temperature coefficient between −70° C to +100° C was constant giving a linear variation of dielectric constant with temperature. The stability of the dielectric constant of BaTi$_4$O$_9$ is apparent from FIG. 3 with a dielectric constant value of less than 38.1 at a temperature of −70° C and a dielectric constant value of greater than 37.8 at +100° C.

Figure 3:
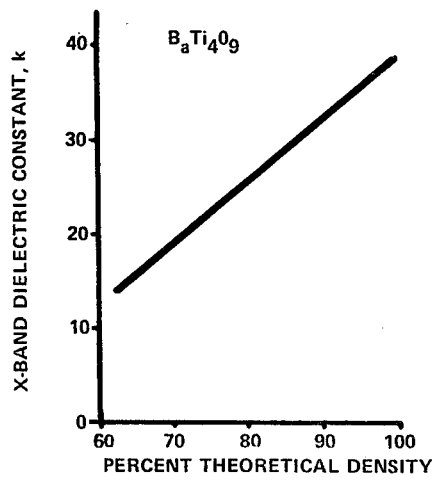
FIG. 3 is a graph of the X-band dielectric constant of $BaTi_4O_9$ vs. the percent theoretical density of the material.
Figure 4:
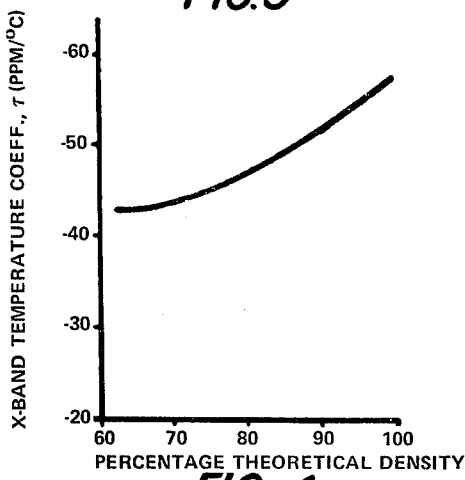
FIG. 4 is a plot of the X-band temperature coefficient in ppm per degree centigrade vs. the percent theoretical density for $BaTi_4O_9$.

Referring now to FIGS. 3 and 4, plots of the dielectric constant and temperature coefficient of dielectric constant respectively as a function of the percent theoretical density of BaTi$_4$O$_9$ are plotted. The dielectric constant extrapolates to $l = 39.5$ and the temperature coefficient to $\tau = -57$ ppm per degree centigrade at theoretical density. It is apparent that for densities in excess of about 85 percent theoretical, the temperature coefficient is essentially proportional to the percent density. The dielectric constant was measured at X-band in both FIGS. 3 and 4, however, substantially the The averages for the above dielectric microwave data are $l = 37.81 \pm 0.30$, $\tan \delta = 6.5 \pm 3.0 \times 10^{-4} = 6.5 \pm 3.0$ and $\tau$ 53.4 $\pm$ 6.3 ppm per degree centigrade. The consistency of properties from batch to batch is in part the result of the reproducibility of the density and microstructure of BaTi$_4$O$_9$ in accordance with the instant method. In a typical fired batch the grain size is on the order of 10 microns or less and although the grains are not equi-axed, which is normal for a non-cubic, material the grain size is small enough that intergranular cracking caused by anisotropic thermal expansion of the grains is not observed. This produces a body with good mechanical properties. The absence of intergranular cracking also leads to a minimum number of grain pull outs during any subsequent polishing which coupled with a noticeable lack of porosity makes the material very amenable to polishing for microwave intergrated circuit substrate applications. The following table is a list of modulus of rupture measurements on BaTi$_4$O$_9$ samples made on an Instron tensile tester model TT-CM-1 in four point bending with the samples 2 inches long with the 2 loading points at 1 inch separations. At a cross head speed of 0.05 centimeters per minute the modulus of rupture of fracture strength, $\sigma_f = 1.5p/BH2$ where $p$ is the load at fracture, $B$ the sample width and $H$ the sample thickness.

| Sample No. | Width b in. | Thickness h in. | Load p lb. | $\sigma_f$ psi |
|---|---|---|---|---|
| 1 | 0.3039 | 0.1448 | 66.5 | 15,654 |
| 2 | 0.3040 | 0.1266 | 43.0 | 13,301 |
| 3 | 0.3041 | 0.1282 | 53.0 | 15,906 |
| 4 | 0.3072 | 0.1281 | 50.0 | 14,878 |
| 5 | 0.3070 | 0.1281 | 57.0 | 16,985 |
| 6 | 0.3067 | 0.1246 | 46.4 | 14,613 |

-continued tric material obtained on 9 batches produced either by sintering or hot pressing:

| | Sintering or Hot Pressing Conditions | | Density | | 1 MHz | | X-Band | | |
|---|---|---|---|---|---|---|---|---|---|
| Batch No. | Temp (° C) | Time min | Bulk g/cc | Per- cent | k | tan $10^{-4}$ | k | tan $10^{-4}$ | $\tau$ ppm °C |
| 1 | 1270 | 600 | 3.34 | 96.2 | 26.79 | 35.3 | 25.82 | 2.33 | −38 |
| 2 | 1270 | 600 | 3.36 | 96.9 | 26.68 | 17.3 | 25.79 | 1.29 | −41 |
| 3 | 1260 | 600 | 3.34 | 96.1 | 26.67 | 21.3 | 26.32 | 3.3 | −43 |
| 4 | 1260 | 600 | 3.28 | 94.5 | 26.04 | 40.5 | 25.79 | 1.39 | −35 |
| 5 | 1260 | 600 | 3.28 | 94.5 | 25.89 | 41.2 | 25.77 | 2.4 | −34 |
| 6 | 1255 | 600 | 3.30 | 95.0 | 25.87 | 44.2 | 25.95 | 1.3 | −41 |
| 7 | 1255 | 600 | 3.30 | 95.0 | 25.38 | 47.6 | 25.95 | 5.5 | −37 |
| 8 | 1255 | 600 | 3.31 | 95.4 | 25.66 | 49.7 | 25.99 | 2.4 | −38 |
| 9 | 1255 | 600 | 3.32 | 95.6 | 26.21 | 49.5 | 26.22 | 4.3 | −41 |

| Sample No. | Width b in. | Thickness h in. | Load p lb. | $\sigma_f$ psi |
|---|---|---|---|---|
| 7 | 0.3068 | 0.1273 | 62.4 | 18,875 |
| 8 | 0.3042 | 0.1247 | 52.4 | 16,617 |
| 9 | 0.3033 | 0.1248 | 54.4 | 17,273 |
| 10 | 0.3038 | 0.1362 | 53.3 | 15,524 |
| 11 | 0.3060 | 0.1286 | 52.2 | 15,471 |

The average value of $\sigma_f$ is 15,918 ± 1423 psi.

The average thermal expansion coefficient of BaTi$_4$O$_9$ from room temperature to 900° C has been found to be $\alpha = 9.4 \times 10^{-6}$ /°C$^{-1}$. The thermal expansion coefficient Δl/l 0 ×10$^{-3}$ ranged linearly from approximately 1.2 at 200° C to 9.0 at 1000° C. The following table is a summary of the properties of BaTi$_4$O$_9$ made in accordance with the present invention.

| Composition (single phase) | BaTi$_4$O$_9$ |
|---|---|
| Water Absorption (percent) | <0.00 |
| Specific Gravity (percent theoretical) | 98.00 ± 0.57 |
| Color | Tan |
| Hardness (Moh's) | 7 |
| Coefficient of Thermal Expansion (° C$^{-1}$) | 9.4 × 10$^{-6}$ |
| Modulus of Rupture (psi) | 16,000 ± 1400 |
| Dielectric Constant (X-Band) | 37.81 ± 0.30 |
| Dielectric Loss Tangent (X-Band) | 6.5 ± 3.0 × 10$^{-4}$ |
| Temperature Coefficient of Dielectric Constant (X-Band, ppm ° C$^{-1}$) | −53.4 ± 6.3 |
| Temperature Coefficient (corrected for sample expansion) | −60.31 ± 6.3 |

Another class of temperature compensated high dielectric constant material is obtained from the Li$_2$O-TiO$_2$ system. This material is a two phase composition of 48 volume percent Li$_2$TiO$_3$ and 52 volume percent Li$_4$Ti$_5$O$_{12}$, having a dielectric constant of approximately 26, and which may be produced by substantially the same method as that previously described for producing BaTi$_4$O$_9$. The dielectric properties and density are both unaffected by processing conditions and batch to batch reproducibility with consistency of properties may be obtained. The following is a table of the microwave dielectric properties of the lithium titanate dielectric material are exceedingly low and consistent. The modulus of rupture of lithium titanate has been found to be 6664 ± 3109 psi when measured on an Instron tensile tester in the same manner as was the BaTi$_4$O$_9$ material. The thermal expansion coefficient of the lithium titanate was found to be 19.37 × 10$^{-6}$°C$^{-1}$ when measured between 200° and 900° C. The following is a summary of properties of the two phase composition of Li$_2$TiO$_3$ and Li$_4$Ti$_5$O$_{12}$:

| Composition (two phase) | Li$_2$O . 1.5 TiO$_2$ |
|---|---|
| Water Absorption (percent) | 0.12 ± 0.08 |
| Specific Gravity (percent theoretical) | 94.6 ± 1.9 |
| Color | White |
| Hardness (Moh's) | <6 |
| Coefficient of Thermal Expansion (° C$^{-1}$) | 19.4×10$^{-6}$ |
| Modulus of Rupture (psi) | 6700 ± 3100 |
| Dielectric Constant (X-Band) | 25.65 ± 0.88 |
| Dielectric Loss Tangent (X-Band) | 2.55 ± 1.76×10$^{-4}$ |
| Temperature Coefficient of Dielectric Constant (X-Band, ppm ° C$^{-1}$) | −39.6 ± 4.2 |
| Temperature Coefficient (corrected for sample expansion) | −53.69 ± 4.2 |

Another class of temperature compensated microwave dielectric material has been found to be a mixture of MgTi$_2$O$_5$ and TiO$_2$, which material may effectively be prepared by the same method as is BaTi$_4$O$_9$, that is by mixing oxides of the constituents in ball mills with appropriate allowance in the formulation to take into account the addition of one of the constituents due to abrasion of the mill lining and media. The mixture is then calcined at temperatures of approximately 1400° for 10 hours in an oxidizing atmosphere and then either hot pressed or conveniently fired for densification with drying and screening after the ball milling step. This material offers a relatively high dielectric constant with low dielectric loss and high density. Stoichiometric quantities of magnesium titanate with 16 volume percent free TiO$_2$ are required. The following table lists the dielectric properties of MgTi$_2$O$_5$-TiO$_2$ as measured on nine batches made in accordance with the method of the instant invention.

| | Sintering or Hot Pressing Conditions | | Density | | 1 MHz | | X-Band | | |
|---|---|---|---|---|---|---|---|---|---|
| Batch No. | Temp (° C) | Time min | Bulk g/cc | Per- cent | k | tan $10^{-4}$ | k | tan $10^{-4}$ | $\tau$ ppm °C |
| 1 | 1410 | 600 | 3.53 | 94.9 | 22.10 | 21.1 | 21.30 | 2.93 | +45 |

-continued

| Batch No. | Sintering or Hot Pressing Conditions | | Density | | 1 MHz | | X-Band | | |
|---|---|---|---|---|---|---|---|---|---|
| | Temp (° C) | Time min | Bulk g/cc | Per-cent | k | tan $10^{-4}$ | k | tan $10^{-4}$ | $\tau$ ppm ° C |
| 2 | 1410 | 600 | 3.56 | 95.4 | 22.77 | 25.3 | 22.13 | 2.13 | +46 |
| 3 | 1410 | 600 | 3.58 | 95.7 | 24.50 | 107.7 | 23.13 | 1.25 | +12 |
| 4 | 1410 | 600 | 3.61 | 96.3 | 24.68 | 22.3 | 24.29 | 5.25 | + 1.3 |
| 5 | 1410 | 600 | 3.62 | 96.0 | 25.98 | 20.3 | 25.40 | 4.38 | −22 |
| 6 | 1390 | 600 | 3.62 | 96.5 | 26.76 | 242. | 24.17 | 14.4 | + 2.2 |
| 7 | 1390 | 600 | 3.62 | 96.5 | 25.36 | 139. | 24.15 | 10.3 | + 5.5 |
| 8 | 1410 | 600 | 3.56 | 94.9 | 24.84 | 242. | 23.60 | 4.2 | + 9 |
| 9 | 1410 | 600 | 3.56 | 94.9 | 24.18 | 63.2 | 23.62 | 4.19 | +11 |

A plot of the dielectric constant and temperature coefficient of magnesium titanate vs. the volume fraction of $TiO_2$ indicates that perfect compensation should occur at approximately 16.5 volume percent $TiO_2$.

A summary of the dielectric properties of magnesium titanate appears in the table below:

| Composition (two phase) | 84 v/o $MgTi_2O_5$—16 v/o $TiO_2$ |
|---|---|
| Water Absorption (percent) | 0.43 ± 0.12 |
| Specific Gravity (percent theoretical) | 95.9 ± 0.80 |
| Color | Gray |
| Hardness (Moh's) | <7 |
| Coefficient of Thermal Expansion (° $C^{-1}$) | $1.87 \times 10^{-6}$ |
| Modulus of Rupture (psi) | 2723 ± 2.4 |
| Dielectric Constant (X-Band) | 23.97 ± 0.33 |
| Dielectric Loss Tangent (X-Band) | $7.7 \pm 4.5 \times 10^{-1}$ |
| Temperature Coefficient of Dielectric Constant (X-Band, ppm ° $C^{-1}$) | +5.8 ± 4.2 |
| Temperature Coefficient (corrected for sample expansion) | +4.4 ± 4.2 |

An additional dielectric material which may be fabricated by the process described with respect to the method of manufacturing $BaTi_4O_9$ shown in FIG. 1 is a two phase mixture of $Zn_2TiO_4$ and $TiO_2$. $Zn_2TiO_4$ has a positive temperature coefficient and $TiO_2$ a negative temperature coefficient, therefore the two phase mixture of the two compositions results in a compensated material. The following table lists the dielectric properties of a $Zn_2TiO_4\text{-}TiO_2$ system as measured on a sample mode in accordance with the instant invention:

| Batch No. | Sintering or Hot Pressing Conditions | | Density | | 1 MHz | | X-Band | | |
|---|---|---|---|---|---|---|---|---|---|
| | Temp (° C) | Time min | Bulk g/cc | Per-cent | k | tan $10^{-4}$ | k | tan $10^{-4}$ | $\tau$ ppm ° C |
| 1 | 1280 | 600 | 4.84 | | 19.69 | 44.6 | 19.05 | 8.32 | +104 |
| 2 | 1280 | 600 | 4.83 | | 19.71 | 45.7 | 19.13 | 9.24 | +104 |
| 3 | 1280 | 600 | 4.79 | | 19.75 | 43.4 | 19.22 | 11.0 | +103 |
| 4 | 1250 | 600 | 4.88 | | 19.86 | 43.4 | 19.01 | 10.0 | + 88 |
| 5 | 1250 | 600 | 4.86 | | 20.02 | 38.3 | 19.24 | 10.3 | +109 |
| 6 | 1250 | 600 | 4.94 | | 24.55 | 72.3 | 23.92 | 9.3 | − 8 |
| 7 | 1260 | 600 | 4.89 | | 24.71 | 36.3 | 24.03 | 7.2 | − 31 |
| 8 | 1265 | 600 | 4.89 | | 24.58 | 36.8 | 24.00 | 8.3 | − 12 |
| 9 | 1265 | 600 | 4.89 | | 24.58 | 38.4 | 23.96 | 8.2 | − 17 |

For a compensated system the weight fraction of $Zn_2TiO_4$ should be approximately 75 percent with 25 percent $TiO_2$. A summary of the microwave dielectric properties of the zinc titanate system is listed below, in which the fraction of $Zn_2TiO_4$ is 75 percent.

| Composition (two phase) | 45.19 mole percent $TiO_2$ |
|---|---|
| Water Absorption (percent) | <0.00 |
| Specific Gravity (g/cc) | 4.900 ± 0.023 |
| Color | Light Yellow |
| Hardness (Moh's) | ~7 |
| Coefficient of Thermal Expansion (° $C^{-1}$) | $11.47 \times 10^{-6}$ |
| Modulus of Rupture (psi) | 13,294 ± 1711 |
| Dielectric Constant (X-Band) | 23.97 ± 0.04 |
| Dielectric Loss Tangent (X-Band) | $8.25 \pm 0.89 \times 10^{-4}$ |
| Temperature Coefficient of Dielectric Constant (X-Band, ppm ° $C^{-1}$) | −17.0 ± 10.0 |
| Temperature Coefficient (corrected for sample expansion) | −25.3 ± 10.0 |

The materials described above are of high relative densities with low dielectric losses and a range of dielectric constant values and temperature coefficients of the dielectric constant from strongly positive to strongly negative including perfect temperature compensation. The dielectric constants at X-band range from 16 to 100, the temperature coefficient of dielectric constant ranges from +200 to −800, and the dielectric loss tangent at X-band is less than $9 \times 10^{-4}$. Composite high dielectric composite materials are disclosed in which the dielectric characteristics of two phase compositions are the result of the combination of properties of the constituent materials.

While particular embodiments of the invention have been shown and described, various modifications thereof will be apparent to those skilled in the art. For example, the dielectric constant of $BaTi_4O_9$ may be tailored to fall within the range of approximately 38 to 100 by mixing in varying amounts of $TiO_2$ thereby forming a composite material with a more negative temperature coefficient. Therefore, it is not intended that the invention be limited to the disclosed embodiments of details thereof and departures may be made therefrom within the spirit and scope of the invention as defined in the appended claims.

What is claimed is:

1. A method of forming a dielectric from titanium dioxide comprising the steps of:

mixing stoichiometric quantities of $TiO_2$ and a carbonate drawn from the class of carbonates consisting of $BaCO_3$, $Li_2CO_3$, $MgCO_3$ and $ZnCO_3$ to provide a mixture thereof;

milling said mixture in a ball mill containing a liquid medium to produce a liquid slurry;

drying said liquid slurry to produce a dried mixture;

granulating said dried mixture;

calcining said granulated mixture at a temperature within the temperature range of 800° to 1300° C to provide a chemical reaction between said stoichiometric quantities of $TiO_2$ and of the carbonate of said class of carbonates wherein there is formed a product drawn from the class of substances consisting of $BaTi_4O_9$, a mixture of $Li_2TiO_3$ and $Li_4Ti_5O_{12}$, $MgTi_2O_5$—$TiO_2$ and $Zn_2TiO_4$—$TiO_2$;

ball milling said product to produce a powder thereof;

compressing said powdered product in a mold with pressure in the range of 1500 to 10,000 pounds per square inch to increase the density and dielectric constant of said powder; and firing said compressed powder in an oxidizing atmosphere at a temperature in the temperature range of 1100° to 1450° C until the density of said compressed powder has exceeded approximately 85% of the theoretical maximum density, thereby stabilizing the dielectric constant of said compressed powder with respect to variations in the temperature of said compressed powder.

* * * * *